Figure 1:
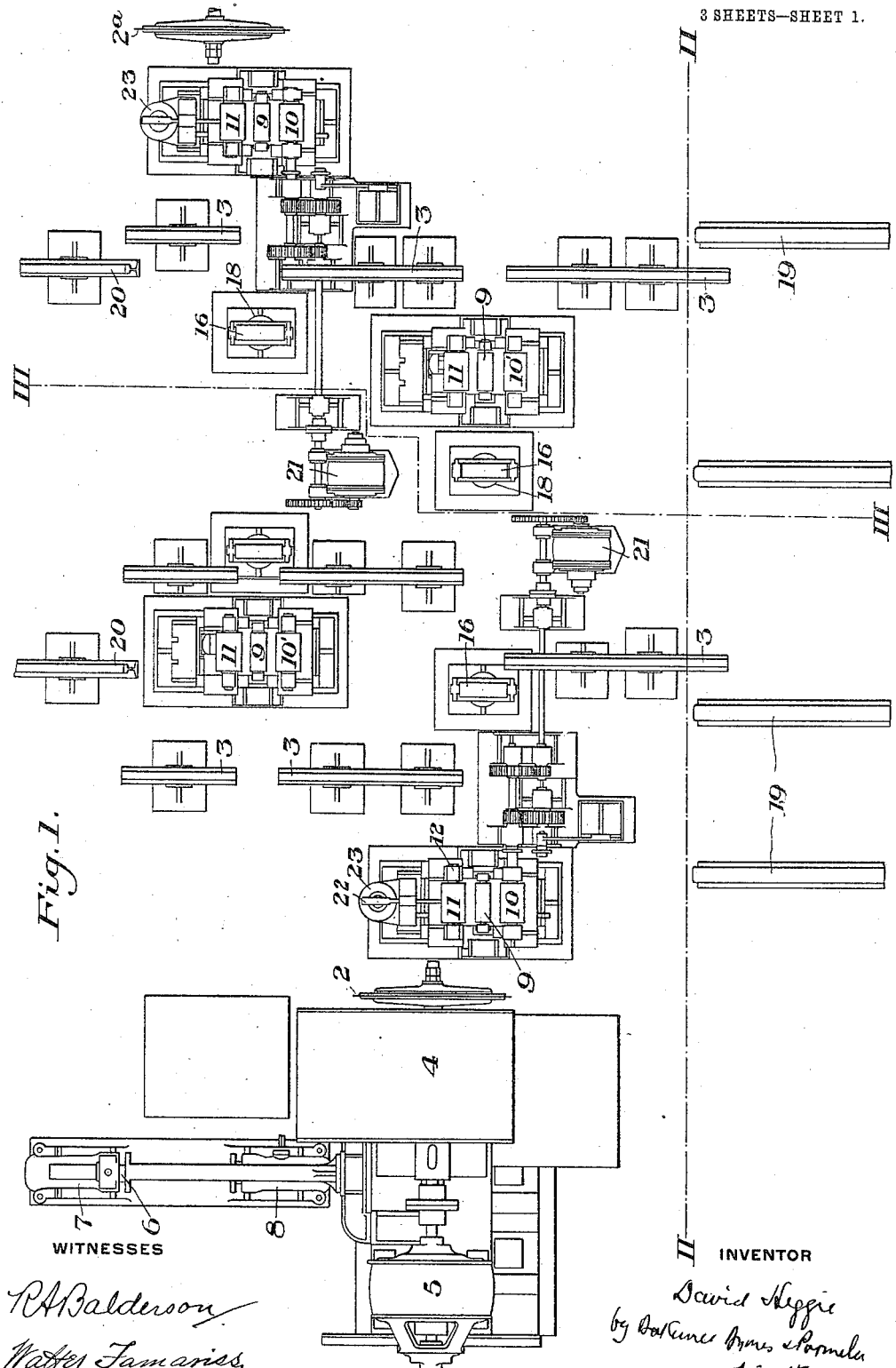

D. HEGGIE.
APPARATUS FOR SAWING PIPES AND SIMILAR ANNULAR BODIES.
APPLICATION FILED AUG. 4, 1909.

960,640.

Patented June 7, 1910.
3 SHEETS—SHEET 1.

WITNESSES
INVENTOR

D. HEGGIE.
APPARATUS FOR SAWING PIPES AND SIMILAR ANNULAR BODIES.
APPLICATION FILED AUG. 4, 1909.
960,640.
Patented June 7, 1910.
3 SHEETS—SHEET 2.
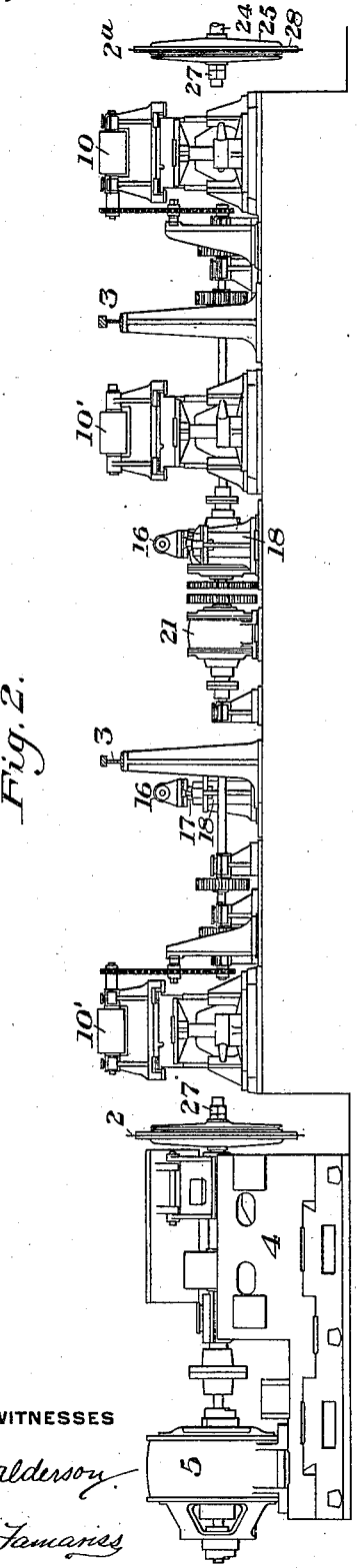
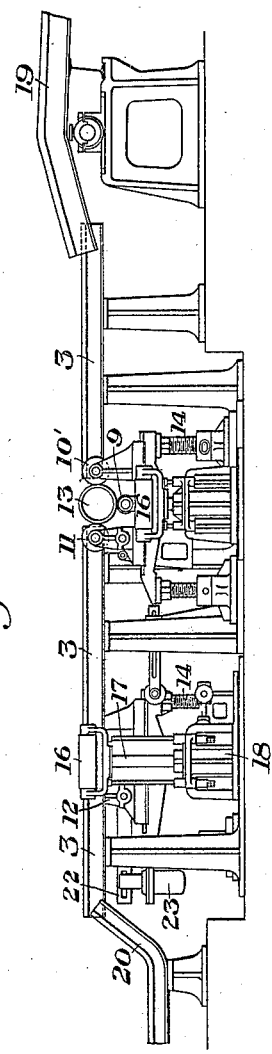
WITNESSES
INVENTOR

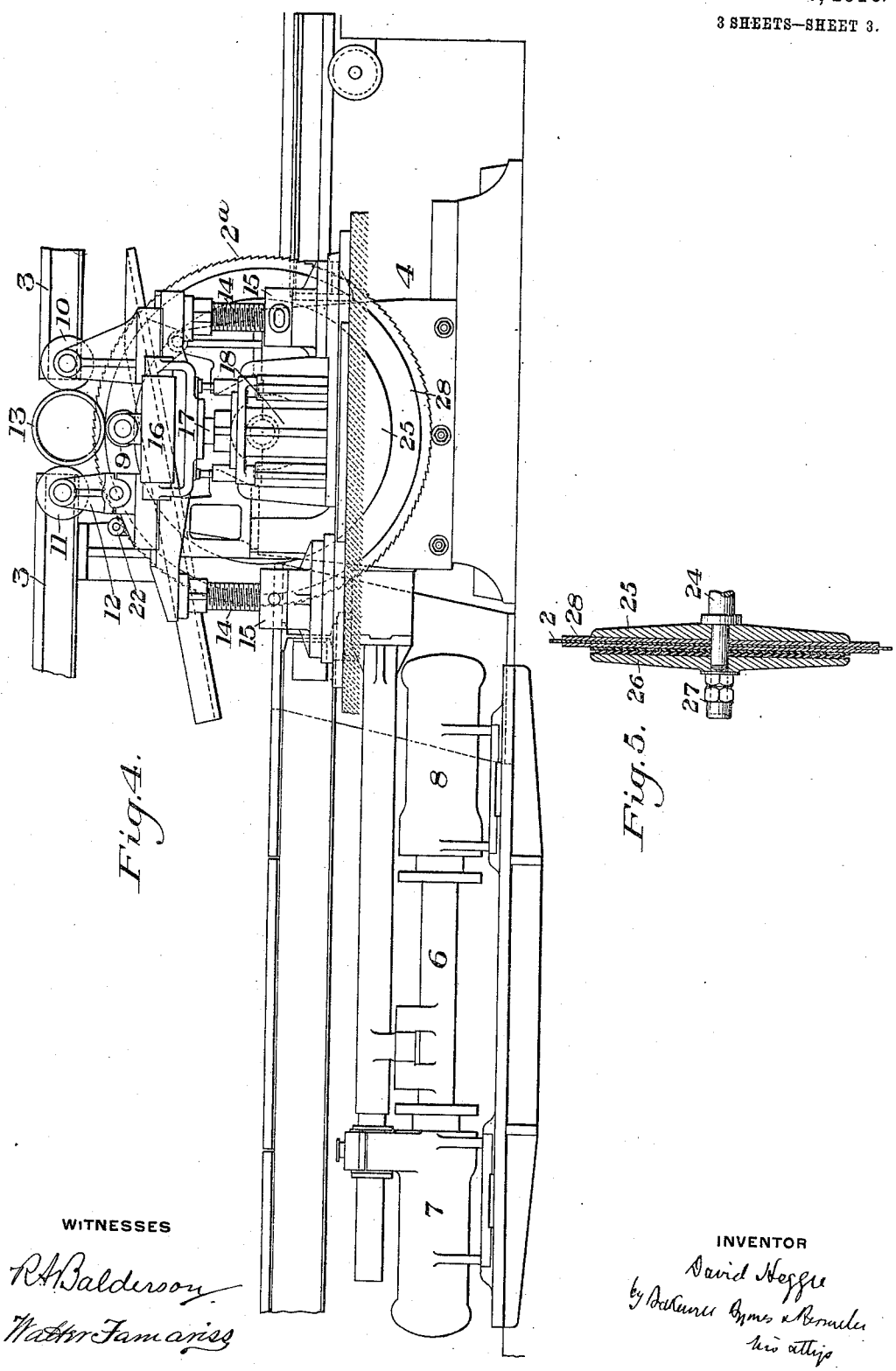

UNITED STATES PATENT OFFICE.

DAVID HEGGIE, OF LORAIN, OHIO, ASSIGNOR TO NATIONAL TUBE COMPANY, OF PITTSBURG, PENNSYLVANIA, A CORPORATION OF NEW JERSEY.

APPARATUS FOR SAWING PIPES AND SIMILAR ANNULAR BODIES.

960,640.  Specification of Letters Patent.  Patented June 7, 1910.

Application filed August 4, 1909. Serial No. 511,192.

*To all whom it may concern:*

Be it known that I, DAVID HEGGIE, of Lorain, in the county of Lorain and State of Ohio, have invented a new and useful Apparatus for Sawing Pipes and Similar Annular Bodies, of which the following is a full, clear, and exact description, reference being had to the accompanying drawings, forming part of this specification, in which—

Figure 1 is a top plan showing pipe sawing apparatus constructed and arranged in accordance with my invention. Fig. 2 is a transverse sectional elevation of the same on the line II—II of Fig. 1. Fig. 3 is a sectional side elevation on the line III—III of Fig. 1, showing the apparatus upon which the pipes are supported and rotated during the sawing operation, in relation with the pipe handling mechanism. Fig. 4 is an end elevation on a larger scale partly in section, showing the saw and the pipe supporting mechanism with the means employed for clamping and rotating the pipe during the sawing operation. Fig. 5 is a detail sectional elevation on a larger scale showing the saw as mounted on the saw mandrel in accordance with my invention.

My invention relates to apparatus for sawing pipes, tubes and similar annular articles in cropping the ends and cutting such articles to length and the invention further relates to improved means for handling and manipulating the pipes during the cutting operations.

The invention further relates to improvements in the construction and arrangement of the saw and saw mandrel also forming part of my invention.

The object of the invention is to provide pipe sawing apparatus having improved means by which the pipes are held and are rotated during the sawing operation.

Another object of my invention is to provide means for handling the pipes in bringing them to and from the clamping mechanism by which they are held during the cutting operation.

In the drawings 2 and $2^a$ represent saws which are located on opposite sides of the pipe supporting bed formed by the skids 3—3. The saws are movably mounted on saw carriers 4 which also support the saw driving motors 5. The carriages 4 with the saws and the motors mounted thereon are moved into and out of the cutting positions by means of the plunger 6 having its opposite ends mounted in the single acting hydraulic cylinders 7 and 8.

In front of and axially parallel with the axis of each of the saws 2 and $2^a$ are the rotators comprising the supporting anti-friction rollers 9, the positively driven pipe rotating rollers 10 and the anti-friction clamping rollers 11. The rollers 11 are mounted on the arms 12 which are pivotally mounted on the rotators. The rotators are arranged to be adjusted vertically by means of the adjusting screws 14 and adjusting nuts 15, so as to bring the pipes 13 into proper cutting position relative to the saws 2 and $2^a$. The pipe 13 is arranged to be supported in such manner that its horizontal axis is slightly below that of the axis of the rollers 10 and 11 so that when the roller 11 is moved into contact with the pipe, the pipe is clamped in the rotator and its movement vertically in the rotator is prevented. Between the rotators formed by the rollers 9, 10 and 11 are the pipe supporting rollers 16 which are secured on the upper ends of plungers 17 mounted in the vertical fluid pressure cylinders 18. The rollers 16 are arranged to engage with and lift the pipes 13 from their position on the rotators formed by the rollers 9, 10 and 11 up to the level of the skids 3 on which the pipes are rolled into and out of their position on the rotators. The pipes to be cut are delivered to the skids 3 from the skids 19 and the cut pipes are delivered from the skids 3 after the cutting operations on to the cradle 20 on the opposite end of the supporting table formed by the skids 3. A collection of the cut pipes is removed from the cradle 20 at intervals by means of an overhead traveling crane or in any other desired manner.

It will be seen by reference to Fig. 1 that the saws 2 and $2^a$ are staggered with relation to each other and that a pair of rotators formed by the rollers 9, 10 and 11 are arranged with their axis of rotation parallel with the axis of the two saws 2 and $2^a$. In this way the opposite ends of each pipe is cut by the saws 2 and $2^a$ at different times.

The rollers 10 on the rotators are positively rotated through the medium of suitable driving chains and gearing by the motors 21, and the anti-friction rollers 10' may or may not be positively driven as is desired, one or more of the rollers 10—10' being positively driven on each rotator. The pivoted arms 12 on which the anti-friction rollers 11 are mounted are connected by links 22 to the fluid pressure cylinders 23, by which the rollers 11 are brought into engagement with the pipes when locked into position on the rotator.

The saws 2 and 2ª are mounted upon the saw mandrels 24 and are held in place by the usual saw disks 25 and 26 together with the nut 27. In addition to the disks 25 and 26 auxiliary disks 28 are employed which are of such diameter that they extend outwardly to within a short distance of the periphery of the saws.

By my improved means for sawing pipes, the necessity of having the blade of the saw of such diameter that it can cut through the full diameter of the pipe is overcome. The pipe is rotated and it is merely necessary to cut through the thickness of the wall of the pipe. I am enabled to use saws of very much smaller diameter and to reinforce and greatly strengthen the saws by means of the disks 28. The range in which the saws can be redressed is greatly increased and saws of very much smaller diameter than it has heretofore been possible to use may be employed with my improved apparatus.

In the operation of the apparatus the pipes are delivered from the welding and straightening rolls, the pipes moving from the skids 19 to the skids 3 and being successively brought to rest on the lifting rollers 16 which are in line with the rotator and its saw. The supporting rollers 16 are then lowered by means of the fluid pressure cylinders from the position shown at the left of Fig. 3 into that shown on the right of Fig. 3. Each pipe 13 by this movement is brought into engagement with and is supported on the anti-friction rollers 9. The cylinder 23 is then caused to move the anti-friction roller 11 into engagement with the pipe 13. The center of the pipe being slightly lower than that of the rollers 10 and 11, the movement of the roller 11 will clamp the pipe 13 in place on the rotator and still permit of its freely turning or rotating. The piston 6 in the cylinder 7 and 8 is then caused to move the frame or carriage 4 on which the saw 2 is mounted to bring the saw into engagement with and cut through the wall of the pipe. When the saw 2 cuts through the wall of the pipe an electric contact is made which will cause the motor 21 to rotate and in turn, through the connecting slow down gearing, rotate the rollers 10. When the rollers 10 are rotated the pipe 13 is also caused to rotate and the saw, being in engagement with the pipe, the pipe is quickly cut and its end cropped. The saw 2 is then moved backwardly until out of engagement with the pipe and the supporting rolls 16 are caused to rise so as to lift the pipe 13 until its lower side is on the level of the skids 3. The pipe is then rolled forwardly until it is in line with the saw 2ª. The supporting rollers 16 in line with the saw 2ª are then depressed so as to lower the pipe 13, which now has been cropped on one end, into the rotator opposite the saw 2ª. The pipe 13 is then clamped in position in the rotator opposite the saw 2ª and this saw is moved into engagement with the pipe at its opposite end in the same manner as described above. The saw on cutting through the wall of the pipe again completes an electric circuit so as to actuate the motor and, through the rollers 10, rotate the pipe and in this way crop the other end of the pipe and cut it to length.

In cutting the cropped ends from the pipes, difficulty has heretofore been found in making cuts square and at right angles to the axis of the pipe. This difficulty increases with the diameter of the pipes and, with the larger sizes of the pipe, the cut has frequently been found to be considerably "out of square." By my improved method of cutting through the wall of the pipe and then rotating the pipe, this difficulty is overcome and the pipes are cut true and square with the expenditure of much less power.

After the pipe 13 has been cut by the saw 3, the supporting rollers 16 are lifted to raise the pipe to the level of the skids 3. On reaching this elevation it is rolled forwardly on the skids 3. The pipes then successively drop on to the skids forming the cradle 20 on which they preferably are accumulated and are removed at intervals.

The above described operations are carried out with the successive pipes and obviously a pipe may be in the rotators opposite each saw and two pipes may be cut at the same time.

The advantages of my invention are many and will be apparent to those skilled in the art. The apparatus is simple and is easily kept in repair. By cutting through the wall of the pipe and then rotating the pipe to complete the severing of the crop end, the pipes are cut square and the travel of the saw necessary to cut the pipes is greatly lessened. The employment of the auxiliary disks on the saw blade stiffens the saw and prevents its deflection sidewise. The diameter of the saw can be very much less than in the apparatus used heretofore, as it is only necessary to cut through the thickness of the wall of the pipe instead of having a saw whose diameter must be more than twice the diameter of the pipe. By providing rotators opposite each other, the pipes are easily manipulated and the lifting rollers 16 by which the pipes are raised and lowered into and out of the rotators permit of the pipes being easily and quickly handled.

Modifications in the construction and arrangement of the parts may be made without departing from my invention. But one saw may be used instead of two as shown. The mechanism for driving the rotator rolls may be changed; the sawing mechanism may be varied and other changes may be made without departing from my invention.

I claim:

1. In apparatus for cutting pipes and similar bodies, a pipe support having a supporting roller, oppositely facing friction rollers adapted to secure the pipes on said supporting roller, means for causing the approach of said friction rollers in securing a pipe on said supporting roller and mechanism arranged to rotate at least one of said friction rollers and thereby rotate pipes held between the rollers; substantially as described.

2. In apparatus for cutting pipes and similar bodies, a pipe support having a supporting roller, oppositely facing friction rollers adapted to secure the pipes on said supporting roller, means for causing the approach of said friction rollers in securing a pipe on said supporting roller and mechanism arranged to rotate at least one of said friction rollers and thereby rotate pipes held between the rollers, said friction roller being vertically adjustable; substantially as described.

3. In apparatus for cutting pipes and similar cylindrical articles, pipe supports having supporting rollers, oppositely facing friction rollers arranged to contact with and secure the pipes on said supporting rollers, means for positively driving at least one of said friction rollers to rotate the pipes on the supporting rollers, and means arranged to cause the approach of the opposite friction rollers and hold the pipes in place during rotation thereof in cutting said pipes; substantially as described.

4. Apparatus for cutting pipes and similar articles comprising a pipe supporting bed, rotary saws at opposite sides of the bed arranged to act on opposite ends of the pipes, a gap in the bed opposite said saws, means located in the gap arranged to raise and lower a pipe in said gap, mechanism having friction rollers adapted to engage with and hold the pipe in place in said gap, and mechanism for moving said saws into cutting engagement with pipes held in the gap; substantially as described.

5. Apparatus for cutting pipes and similar articles comprising a pipe supporting bed, rotary saws at opposite sides of the bed arranged to act on opposite ends of the pipes, the saws being staggered so as to bring their axes into different planes, a gap in the cooling bed opposite said saws, means located in the gap arranged to raise and lower a pipe in said gap, mechanism having friction rollers adapted to engage with and hold the pipe in place in the gap, and mechanism for moving said saws into cutting engagement with pipes held in said gap; substantially as described.

6. Apparatus for severing pipes and similar articles comprising a series of skids forming a pipe supporting bed, gaps extending transversely across the width of said bed, means located in said gaps arranged to lower and raise pipes into and out of said gaps, means permitting rotation of the pipes for holding the pipes in place when lowered into said gaps, and oppositely facing positively driven saws at opposite sides of said bed having means arranged to move the saws into engagement with pipes held in position in the gaps and cut said pipes to length; substantially as described.

7. Apparatus for severing pipes and similar articles comprising a series of skids forming a pipe supporting bed, gaps extending transversely across the width of said bed, means located in said gaps arranged to lower and raise pipes into and out of said gaps, means permitting rotation of the pipes for holding the pipes in place when lowered into said gaps, means for frictionally rotating the pipes during the cutting operation, oppositely facing positively driven saws at opposite sides of said bed having means arranged to move the saws with engagement with pipes held in position in the gaps and cut said pipes to length; substantially as described.

8. Apparatus for severing pipes and similar articles comprising a series of skids forming a pipe supporting bed, gaps extending transversely across the width of said bed, means located in said gaps arranged to lower and raise pipes into and out of said gaps, means permitting rotation of the pipes for holding the pipes in place when lowered into said gaps, oppositely facing positively driven saws at opposite sides of said bed having means arranged to move the saws into engagement with pipes held in position in the gaps and cut said pipes to length, and means for adjusting the saws toward and away from each other; substantially as described.

In testimony whereof, I have hereunto set my hand.

DAVID HEGGIE.

Witnesses:
CHAS. PELL,
H. J. ELLEN.